United States Patent
Gamer et al.

[11] 3,820,396
[45] June 28, 1974

[54] FLUID-SIGNAL INDICATOR

[76] Inventors: Abram Yakovlevich Gamer, Minsk, ulitsa Kakhovskaya, 34, kv. 61; Efim Mikhelevich Shandalov, Minsk, ulitsa Promyshlennaya, 14, kv. 1, both of Minsk, U.S.S.R.

[22] Filed: Nov. 10, 1972

[21] Appl. No.: 305,503

Related U.S. Application Data
[63] Continuation of Ser. No. 136,522, April 22, 1971.

[52] U.S. Cl. ............ 73/308, 340/239 R, 340/244 R
[51] Int. Cl. ............................................. G01f 23/10
[58] Field of Search ...... 73/305, 308, 313; 324/122; 315/129, 134–135, 338; 340/239 R, 244 R; 313/129 R; 333/98 R

[56]  References Cited
UNITED STATES PATENTS

| | | | |
|---|---|---|---|
| 2,185,674 | 1/1940 | Michel | 315/129 |
| 2,767,586 | 10/1956 | Jancosek et al. | 73/305 X |
| 3,319,119 | 5/1967 | Redina | 315/240 |
| 3,389,603 | 6/1968 | Jacobs | 73/308 |
| 3,613,438 | 10/1971 | Esam | 73/308 |

Primary Examiner—Richard C. Queisser
Assistant Examiner—Daniel M. Yasich
Attorney, Agent, or Firm—Holman & Stern

[57]  ABSTRACT

A fluid-signal indicator in which a movable element placed inside a transparent guide tube is made in the form of a transparent capsule filled with an inert gas. The indicator has a device to set up an r.f. field encompassing the guide tube or a high-potential field inside the tube, so that when the applied fluid signal displaces the capsule in the guide tube, the capsule finds itself in the zone of the field which causes the gas in the capsule to glow.

3 Claims, 2 Drawing Figures

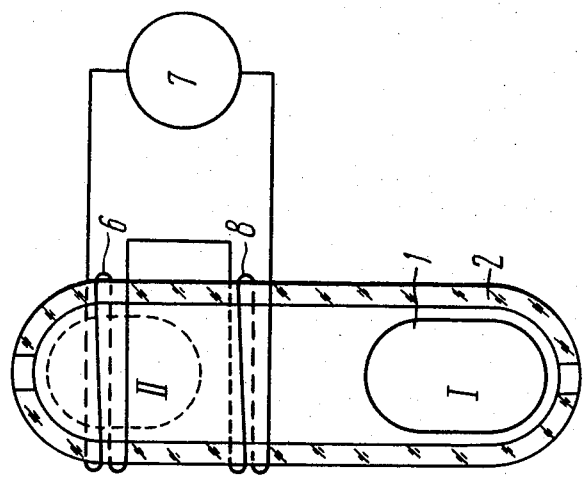
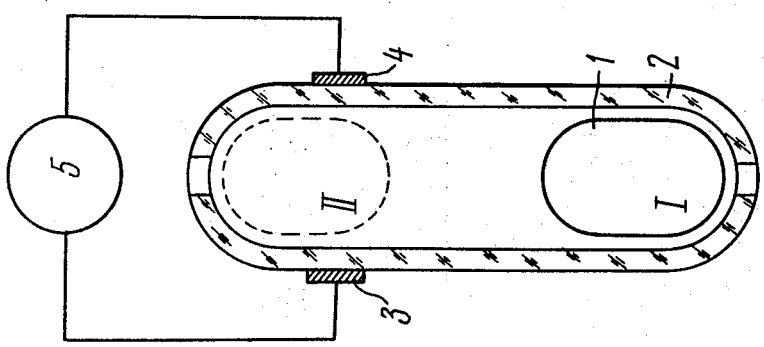

FLUID-SIGNAL INDICATOR

This is a continuation of application Ser. No. 136,532 filed Apr. 22, 1971.

BACKGROUND OF THE INVENTION

The present invention relates to data instrumentation and, more particularly, to fluid-signal indicators.

The invention may be utilized in the output devices of fluidic systems, for liquid level indication in tanks and reservoirs, and for the indication of a predetermined reading of rotameters.

In the prior art, there is fluid-signal indicators comprising a movable element made in the form of a cylinder displaced in a transparent guide tube by an applied fluid signal.

These prior-art fluid-signal indicators suffer from a number of disadvantages, namely, their indication is difficult to discern from a distance and it is not clearly displayed, because of which the operator has to strain his eyes, and this increases the indicating error.

SUMMARY OF THE INVENTION

An object of the invention is to provide a fluid-signal indicator whose indication can be discerned from a great distance, is clearly displaced, and is accurate.

With this and other objects in view, the present invention resides in that in a fluid-signal indicator having its movable element enclosed in a transparent guide tube and displaced in it by an applied fluid signal, the movable element, according to the invention, is made in the form of a transparent capsule filled with an inert gas, and the indicator has a device to set up an r.f. field encompassing the guide tube or a high-potential field inside the tube, so that when a fluid signal is applied to the guide tube the capsule is displaced by the signal and finds itself in the zone of the r.f. or high-potential field which causes the inert gas filling the capsule to glow.

BRIEF DESCRIPTION OF THE DRAWINGS

The invention will be more fully understood from the following description of a preferred embodiment when read in connection with the accompanying drawings wherein:

FIG. 1 shows a sketch of a fluid-signal indicator and a device to set up a high-potential field, according to the invention;

FIG. 2 shows a sketch of a fluid-signal indicator and a device to set up an r.f. field, according to the invention.

DETAILED DESCRIPTION OF PREFERRED EMBODIMENTS

Referring to the drawings, there is a fluid-signal indicator comprising a movable element which is made in the form of a transparent capsule 1 filled with an inert gas, such as neon.

The capsule 1 is placed in a transparent guide tube 2 in which it originally takes up position I. The tube 2 enables the capsule 1 to move under the action of an applied fluid signal. On the side surface of the guide tube 2 there is a device intended to set up a high-potential field, comprising two electrodes 3 and 4 which are connected to a high-voltage source 5. A fluid signal is applied to the tube in the direction of arrow A.

The indicator disclosed herein operates as follows. When a fluid signal is applied to the tube in the direction of arrow A, it causes the capsule 1 to move in the guide tube to position II where the capsule 1 finds itself in the high-potential field established by the electrodes 3 and 4 and the high-voltage source 5. The high-potential field ionizes the inert gas in the capsule 1, and it glow thereby presenting a visual display of the signal.

FIG. 2 shows a second embodiment of the indicator which, instead of a device setting up a high-potential field, uses an r.f. tuned circuit 6 connected with an r.f. oscillator 7. The tuned circuit may comprise an inductor, at least one coiled turn of which embraces the tube 2.

The indicator shown in FIG. 2 operates as follows. When a fluid signal is applied to the tube 2 in the direction of arrow A, the signal causes the capsule 1 to move in the guide tube 2 to position II where it finds itself in the r.f. field established by the r.f. tuned circuit 6. The r.f. field ionizes the inert gas filling the capsule 1, and the gas glows, thereby presenting a visual display of the applied signal.

If the indicator is to display fluid signals at various levels, the r.f. tuned circuit 6 may be extended to include the requisite number of turns 8 on that part of the tube 2 which corresponds to the requisite level of the signal to be displayed.

The glow of the inert gas, corresponding to the level of the fluid signal to be indicated, enables the indication to be discerned from a great distance, presents the information clearly, accurately and reliably, and also facilitates the operator's work.

What is claimed is:

1. A fluid signal indicator comprising: a transparent guide tube having an opening therein to receive fluid signals; a transparent capsule filled with an inert gas and placed inside said transparent guide tube so as it is free to move therein under the action of said signals selectively entering said opening; means for inducing a radio frequency field sufficient to cause the inert gas in said capsule to glow, said means being disposed in close proximity to the external surface of said tube and operatively associated therewith so that only a portion of the length of said tube spaced from said opening is encompassed by the radio frequency field which portion defines an indicative zone of said indicator, whereby when said capsule enters said zone under the action of said fluid signals it begins to glow.

2. A fluid signal indicator as claimed in claim 1, wherein said means for inducing a radio frequency field comprises at least one coil of an inductor embracing said tube in said indicator zone and a radio frequency generator connected to said inductor.

3. A fluid signal indicator as claimed in claim 2, wherein said means inducing the radio frequency field comprises a plurality of said coils connected in series.

* * * * *